(12) United States Patent
Tsumano

(10) Patent No.: US 10,226,979 B2
(45) Date of Patent: Mar. 12, 2019

(54) DAMPING FORCE CONTROL DEVICE FOR VEHICLE

(71) Applicant: TOYOTA JIDOSHA KABUSHIKI KAISHA, Toyota-shi, Aichi-ken (JP)

(72) Inventor: Mitsuhiro Tsumano, Numazu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 126 days.

(21) Appl. No.: 15/598,416

(22) Filed: May 18, 2017

(65) Prior Publication Data
US 2017/0334261 A1    Nov. 23, 2017

(30) Foreign Application Priority Data
May 19, 2016 (JP) .................................. 2016-100744

(51) Int. Cl.
*B60G 17/0195* (2006.01)
*B60G 17/016* (2006.01)
*B62D 5/04* (2006.01)

(52) U.S. Cl.
CPC ..... *B60G 17/0195* (2013.01); *B60G 17/0162* (2013.01); *B60G 17/0164* (2013.01); *B62D 5/0472* (2013.01)

(58) Field of Classification Search
CPC .............. B62D 5/0472; B60G 17/0162; B60G 17/0164
See application file for complete search history.

(56) References Cited

U.S. PATENT DOCUMENTS

| 5,911,768 | A | 6/1999 | Sasaki | |
|---|---|---|---|---|
| 2014/0005889 | A1* | 1/2014 | Hayakawa | B60G 17/01933 701/38 |
| 2015/0088379 | A1* | 3/2015 | Hirao | B60G 17/015 701/37 |
| 2015/0239317 | A1* | 8/2015 | Kurita | B62K 25/04 701/38 |

FOREIGN PATENT DOCUMENTS

| JP | 06-219130 A | 8/1994 |
|---|---|---|
| JP | 07-156627 A | 6/1995 |
| JP | 09-109642 A | 4/1997 |

* cited by examiner

*Primary Examiner* — Anne M Antonucci
*Assistant Examiner* — Reene LaRose
(74) *Attorney, Agent, or Firm* — Sughrue Mion, PLLC

(57) ABSTRACT

A damping force control device for controlling damping forces of shock absorbers by a control device, which is configured to to estimate first vertical speeds at the positions of wheels based on the vertical accelerations of a vehicle body at the positions of the wheels, to estimate second vertical speeds of the vehicle body caused by driver's driving operation based on driving operation amount of the driver, to calculate target damping forces by subtracting products of damping coefficients of the ride comfort control and second vertical speeds from the sums of products of the damping coefficients of the ride comfort control and first vertical speeds and products of damping coefficients for controlling posture change of the vehicle body and the second vertical speeds, and to control damping coefficients of the shock absorbers based on the target damping forces.

6 Claims, 6 Drawing Sheets

DAMPING FORCE CONTROL DEVICE FOR VEHICLE

CROSS-REFERENCE TO RELATED APPLICATION

The disclosure of Japanese Patent Application NO. JP2016-100744 filed on May 19, 2016 is incorporated by reference in its entirety.

BACKGROUND

1. Technical Field

The present disclosure relates to a damping force control device for a vehicle such as an automobile.

2. Description of the Related Art

A damping force control in a vehicle such as an automobile includes a ride comfort control for improving a ride comfort of the vehicle by damping vertical vibrations of a vehicle body caused by inputs from a road surface, and a driving stability control for suppressing a change in posture of the vehicle body caused by driver's operation, i.e., steering, acceleration or deceleration. The damping force control is achieved by controlling damping coefficients of shock absorbers mounted between sprung and unsprung masses corresponding to wheels to target damping coefficients.

However, since the frequency ranges and amplitudes of the vertical vibrations of the vehicle body to be damped by the ride comfort control and the driving stability control are different from each other, the target damping coefficients of the ride comfort control and the driving stability control are different from each other. For this reason, the damping forces should usually be controlled by the ride comfort control and should be controlled by the driving stability control in a situation where a posture of the vehicle body changes due to the driver's operation.

For example, in a situation where the posture of the vehicle body changes due to the driving operation by the driver, the following controls (1)-(3) may be considered. The following control (2) is described, for example, in Japanese Patent Application Laid-open No. H06-219130.
(1) Instead of damping force control by the ride comfort control, damping force control is performed by driving stability control.
(2) A sum of a target damping coefficient of the damping force control by the ride comfort control and a target damping coefficient of the damping force control by the driving stability control is taken as a final target damping coefficient of the damping force control.
(3) A sum of a damping force by the ride comfort control and a damping force of a feedforward control for improving a driving stability is taken as a final target damping force of the damping force control.

In the above control (1), since the damping force control by the ride comfort control and the damping force control by the driving stability control are alternatively performed, it is impossible to suppress changes in posture of the vehicle body while securing good ride comfort in a situation, for example, where the steering operation is performed on a rough road.

In the above controls (2) and (3), since excessive damping forces are included in controlled variables of the damping forces as described in detail later, it is impossible to prevent occurrence of adverse effects such as the occurrence of high frequency vibrations of the vehicle body occurred due to extra damping forces.

SUMMARY

The present disclosure provides an improved damping force control device for a vehicle capable of ensuring a good ride comfort of a vehicle and suppressing a change in posture of a vehicle body without causing adverse effects due to excessive damping forces.

According to the present disclosure, a damping force control device for a vehicle is provided that is configured to control damping force variable type shock absorbers mounted between a sprung mass and unsprung masses corresponding to wheels, and comprises first detection devices that are configured to detect vertical vibration state quantities of the sprung mass at the positions of the wheels, a second detection device that is configured to detect driver's operation amount, and a control unit that is configured to control damping coefficients of the shock absorbers.

The control unit is configured to estimate first vertical speeds of the sprung mass at the positions of the wheels based on the vertical vibration state quantities of the sprung mass, to estimate second vertical speeds of the sprung mass caused by driver's driving operation at the positions of the wheels based on driving operation amount of the driver, to calculate target damping forces by subtracting products of damping coefficients of the ride comfort control and the second vertical speeds from the sums of products of the damping coefficients of the ride comfort control and the first vertical speeds and products of damping coefficients for controlling posture change of a vehicle body and the second vertical speeds, and to control damping coefficients of the shock absorbers based on the target damping forces.

According to the above configuration, first vertical speeds of the sprung mass at the positions of the wheels are estimated based on the vertical vibration state quantities of the sprung mass and second vertical speeds of the sprung mass caused by driver's driving operation at the positions of the wheels are estimated based on driving operation amount of the driver are estimated. Further, target damping forces are calculated by subtracting products of damping coefficients of the ride comfort control and the second vertical speeds from the sums of products of the damping coefficients of the ride comfort control and the first vertical speeds and products of damping coefficients for controlling posture change of a vehicle body and the second vertical speeds, and to control damping coefficients of the shock absorbers based on the target damping forces.

As will be described in detail later, the first vertical speeds are sums of vertical speeds of the sprung mass caused by inputs from a road surface (hereinafter referred to as "third vertical speeds") and vertical speeds of the sprung mass caused by the driver's driving operation. In other words, the third vertical speeds of the sprung mass are values obtained by subtracting the second vertical speeds of the sprung mass from the first vertical speeds of the sprung mass. Therefore, the target damping forces are calculated as values that are equivalent to sums of products of damping coefficients of the ride comfort control and the third vertical speeds of the sprung mass, and products of damping coefficients of the posture control and the second vertical speeds of the sprung mass caused by the driver's driving operation. In other words, the target damping forces include no extra damping force other than the products of the damping coefficients of the ride comfort control and the third vertical speeds and the products of the damping coefficients of the posture control and the second vertical speeds. Accordingly, it is possible to ensure good ride comfort of the vehicle without causing adverse effects such as high-frequency vibrations of the vehicle body due to extra damping forces and to suppress changes in posture of the vehicle body caused by driver's driving operation.

Further, in order to obtain the third vertical speed, it is necessary to obtain transfer functions of the vertical acceleration from the wheels to the vehicle body beforehand; to detect the vertical accelerations of the wheels; to calculate vertical accelerations of the vehicle body caused by inputs from a road surface based on the detected vertical accelerations and the transfer functions; and to integrate the vertical accelerations.

According to the above configuration, since the target damping forces can be calculated using the first and second vertical speeds, there is no need to calculate the third vertical speeds. Therefore, special detection devices such as vertical acceleration sensors for detecting vertical accelerations of the wheels and calculations based on detected vertical accelerations are unnecessary.

Aspects of the Present Disclosure

In one embodiment of the present disclosure, the control unit is configured to calculate the target damping forces as sums of products of the damping coefficients of the ride comfort control and the first vertical speeds and products of the second vertical speeds and values that are derived by subtracting the damping coefficients of the ride comfort control from the damping coefficients for controlling posture change of the vehicle body.

According to the above aspect, the target damping forces are calculated as sums of products of the damping coefficients of the ride comfort control and the first vertical speeds and products of the second vertical speeds and values that are derived by subtracting the damping coefficients of the ride comfort control from the damping coefficients for controlling posture change of the vehicle body. Therefore, by obtaining values in advance by subtracting the damping coefficients of the ride comfort control from the damping coefficients of the posture control, the target damping forces can be calculated as the sums of the two products.

In another aspect of the present disclosure, the control unit is configured to estimate a lateral acceleration of the vehicle caused by driver's steering operation based on steering operation amount of the driver, and to estimate the second vertical speeds at the positions of the wheels based on the lateral acceleration of the vehicle.

According to the above aspect, a lateral acceleration of the vehicle caused by driver's steering operation is estimated based on steering operation amount of the driver, and the second vertical speeds at the positions of the wheels are estimated based on the lateral acceleration of the vehicle. Therefore, the vertical speeds at the positions of the wheels due to the rolling of the vehicle caused by driver's steering operation can be estimated as second vertical speeds based on the steering operation amount of the driver.

In particular, the lateral acceleration estimated based on driver's steering operation is advanced in phase compared to an actual lateral acceleration of the vehicle detected by a lateral acceleration sensor. Therefore, it is possible to reduce a possibility that estimation of second vertical speeds will be delayed behind as compared to where second vertical speeds are estimated based on an actual lateral acceleration of the vehicle.

Furthermore, in another aspect of the present disclosure, the control unit is configured to estimate a longitudinal acceleration of the vehicle caused by acceleration/deceleration operation of the driver based on acceleration/deceleration operation amount of the driver, and to estimate the second vertical speeds at the positions of the wheels based on the longitudinal acceleration of the vehicle.

According to the above aspect, the longitudinal acceleration of the vehicle caused by the acceleration/deceleration operation of the driver of the vehicle is estimated based on the acceleration/deceleration operation amount of the driver, and second vertical speeds are estimated based on the longitudinal acceleration of the vehicle. Therefore, the vertical speeds at the positions of the wheels due to the pitching of the vehicle caused by the acceleration/deceleration operation by the driver can be estimated as the second vertical speeds based on the acceleration/deceleration operation amount of the driver.

In particular, the longitudinal acceleration of the vehicle estimated based on the acceleration/deceleration operation amount of the driver is advanced in phase, for example, compared to an actual longitudinal acceleration of the vehicle detected by the longitudinal acceleration sensor. Therefore, it is possible to reduce a possibility that the estimation of the second vertical speed will be delayed behind as compared to where the second vertical speed is estimated based on an actual longitudinal acceleration of the vehicle.

Furthermore, in another aspect of the present disclosure, the control unit is configured to estimate a lateral acceleration of the vehicle caused by driver's steering operation based on steering operation amount of the driver, to estimate a longitudinal acceleration of the vehicle caused by acceleration/deceleration operation of the driver based on acceleration/deceleration operation amount of the driver, and to estimate the second vertical speeds at the positions of the wheels based on the lateral and longitudinal accelerations of the vehicle.

According to the above aspect, a lateral acceleration and a longitudinal acceleration of the vehicle caused by the driver's steering operation and acceleration/deceleration operation are respectively estimated based on the steering operation amount and the acceleration/deceleration operation amount of the driver, and the second vertical speeds at the positions of the wheels are estimated based on the lateral and longitudinal accelerations. Therefore, even when both the estimated steering operation and the acceleration/deceleration operation are performed by the driver and the vehicle rolls and pitches, the vertical speeds at the positions of the wheels can be estimated as the second vertical speeds.

Further, the lateral and longitudinal accelerations of the vehicle estimated based on the steering operation amount and the acceleration/deceleration operation amount of the driver are each advanced in phase as compared to actual lateral and longitudinal accelerations of the vehicle, respectively. Therefore, it is possible to reduce a possibility that estimation of the second vertical speeds will be delayed as compared to where the second vertical speeds are estimated based on actual lateral and longitudinal accelerations of the vehicle.

Furthermore, in another aspect of the present disclosure, the damping force control device has third detection devices that are configured to detect vertical relative speeds of the sprung mass and the unsprung masses at the positions of the wheels, and the control unit is configured to calculate target damping coefficients of the shock absorbers based on the target damping forces and the vertical relative speeds and to control damping coefficients of the shock absorbers based on the target damping coefficients.

According to the above aspect, vertical relative speeds of the sprung mass and the unsprung mass at the positions of the wheels are detected by the third detection devices. Further, target damping coefficients of the shock absorbers are calculated based on the target damping forces and the vertical relative speeds, and the damping coefficients of the shock absorbers are controlled based on the target damping coefficients. Therefore, it is possible to control the damping forces of the shock absorbers so as to be the products of the target damping coefficients and the vertical relative speeds, that is, the target damping forces.

DETAILED DESCRIPTION

Figure 1:
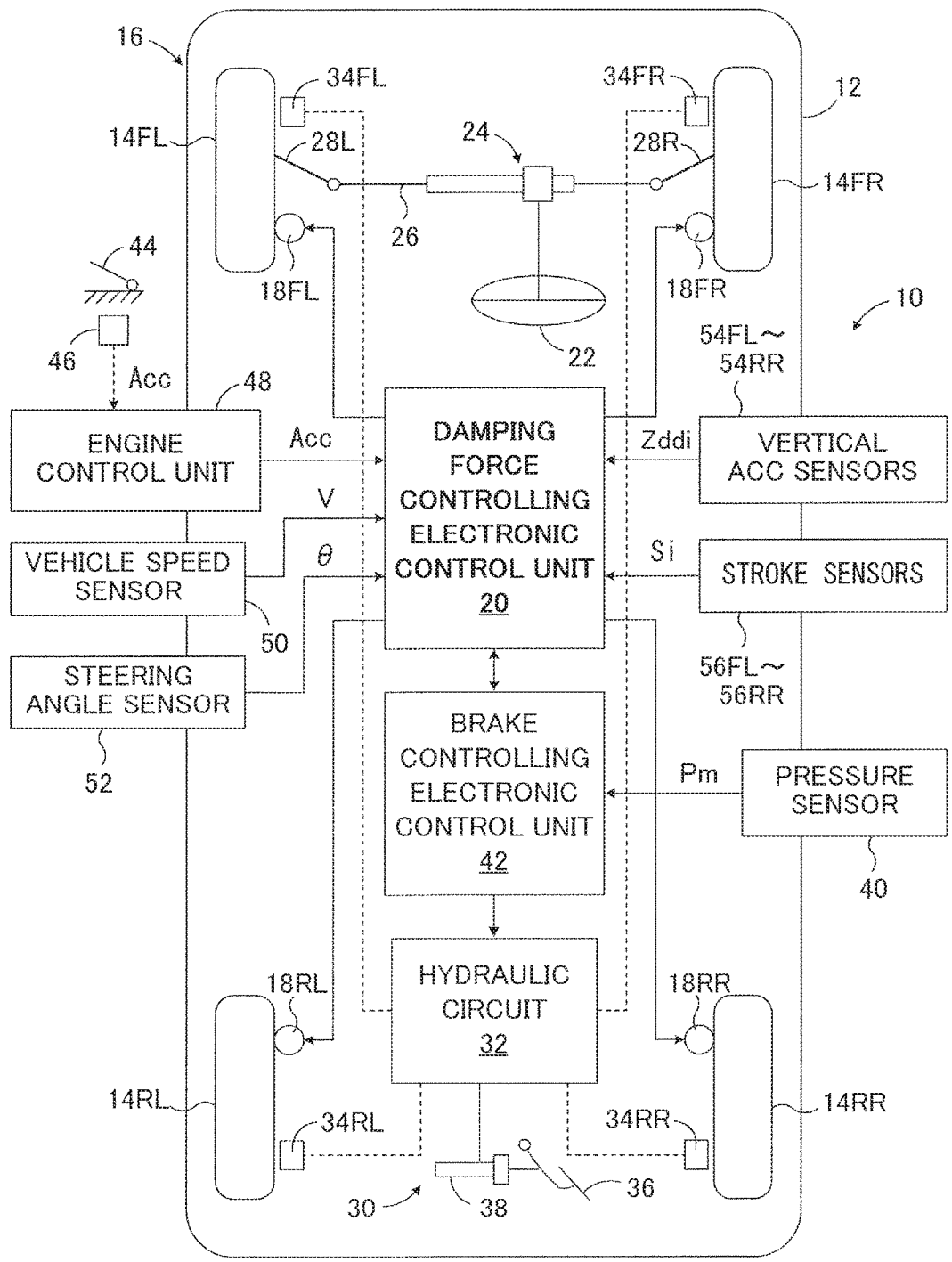
FIG. 1 is a schematic configuration diagram showing a first embodiment of a damping force control device for a vehicle according to the present disclosure.

[Principle of the Present Disclosure Adopted in the Embodiments]

Prior to describing the embodiments, the principle of the damping force control in the present disclosure will be described so as to facilitate understanding of the present disclosure.

In the damping force controls (2) and (3) described in the above "BACKGROUND", as described above, since extra damping forces are included in the damping force controlling variables, it is inevitable that harmful effects such as high frequency vibrations of a vehicle body occur due to the excessive damping forces. First, this problem will be further explained.

Assuming that a vertical speed (first vertical speed) of a vehicle body as a sprung mass is Zbd; and a vertical speed (second vertical speed) of the vehicle body caused by driver's driving operation is Zsd; and a vertical speed (third vertical speed) of the vehicle body caused due to an input from a road surface is Zrd. Further, assuming that a damping coefficient is Cco which is for damping vertical vibrations of the vehicle body caused by inputs from a road surface to improve a ride comfort of the vehicle, and a damping coefficient is Cat which is for reducing posture change of the vehicle body caused by driver's driving operation.

A damping force Fco for improving the ride comfort of the vehicle is expressed by the following equation (1), and a vertical speed Zbd of the vehicle body is expressed by the following equation (2).

$$Fco = Cco \cdot Zbd \quad (1)$$

$$Zbd = Zrd + Zsd \quad (2)$$

<Damping Force Control According to the Control (2)>

In the damping force control according to the above control (2), a sum of a target damping coefficient of the damping force control by the ride comfort control and a target damping coefficient of the damping force control by the driving stability control is set to a final target damping coefficient of the damping force control. Therefore, a damping force Fcoat of this control is expressed by the following equation (3).

$$Fcoat = (Cco + Cat)Zbd \quad (3)$$

From the above equations (2) and (3), the damping force Fcoat can be expressed by the following equation (4).

$$Fcoat = (Cco + Cat)(Zrd + Zsd) \quad (4)$$
$$= Cco \cdot Zrd + Cat \cdot Zsd + Cco \cdot Zsd + Cat \cdot Zrd$$

Thus, in addition to the damping force $Cco \cdot Zrd$ for improving the ride comfort of the vehicle and the damping force $Cat \cdot Zsd$ for suppressing the posture change of the vehicle body, the damping force Fcoat includes extra damping forces $Cco \cdot Zsd$ and $Cat \cdot Zrd$. Therefore, it is inevitable that adverse effects such as high-frequency vibrations of the vehicle body occur due to the extra damping forces.

<Damping Force Control According to the Control (3)>

In the damping force control according to the above control (3), a sum of the damping force by the ride comfort control and the feedforward damping force for improving the driving stability is set a final target damping force of the damping force control. Therefore, the damping force Fcoat of this control is expressed by the following equation (5).

$$Fcoat = Cco \cdot Zbd + Cat \cdot Zsd \quad (5)$$

From the above equations (5) and (3), the damping force Fcoat can be expressed by the following equation (6).

$$Fcoat = Cco(Zrd + Zsd) + Cat \cdot Zsd \quad (6)$$
$$= Cco \cdot Zrd + Cat \cdot Zsd + Cco \cdot Zsd$$

Thus, the damping force Fcoat includes an extra damping force $Cco \cdot Zsd$ in addition to the damping force $Cco \cdot Zrd$ for improving the ride comfort of the vehicle and the damping force $Cat \cdot Zsd$ for suppressing the posture change of the vehicle body. Therefore, even in this damping force control, it is inevitable that harmful effects such as high-frequency vibrations of the vehicle body occur due to the extra damping force.

<Damping Force Control of the Present Disclosure>

It is preferable to calculate the damping force Fcoat according to the following equation (7) in order to improve the ride comfort of the vehicle and suppress the change in the posture of the vehicle body without generating any extra damping force.

$$Fcoat = Cco \cdot Zrd + Cat \cdot Zsd \quad (7)$$

In order to calculate the damping force Fcoat according to the above equation (7), it is necessary to estimate the third vertical speed Zrd of the vehicle body caused by an input from a road surface and the second vertical speed Zsd of the vehicle body caused by the driver's driving operation. With respect to the second vertical speed Zsd of the vehicle body, it is possible to easily perform accurate estimation by estimating lateral and longitudinal accelerations of the vehicle body, for example, based on the driving operation amount of the driver, and integrating these accelerations.

However, it is not easy to accurately estimate the third vertical speed Zrd of the vehicle body. In order to estimate the third vertical speed Zrd of the vehicle body, it is necessary, for example, to derive a transfer function of the vertical acceleration from each wheel to the vehicle body in advance, to detect a vertical acceleration of a wheel, to calculate a vertical acceleration Zrdd of the vehicle body caused by an input from a road surface based on the detected vertical acceleration and the transfer function and to integrate the vertical acceleration. Furthermore, the transfer function of the vertical acceleration from each wheel to the vehicle body varies depending on running conditions of the vehicle, specifically a damping coefficient of a shock absorber, and is therefore a function of the damping coefficient of the shock absorber.

Therefore, in the first mode of the damping force control of the present disclosure, the above equation (7) is equated with the following equation (8).

$$\begin{aligned} Fcoat &= Cco \cdot Zrd + Cat \cdot Zsd \\ &= Cco(Zrd + Zsd) + Cat \cdot Zsd - Cco \cdot Zsd \\ &= Cco \cdot Zbd + Cat \cdot Zsd - Cco \cdot Zsd \end{aligned} \quad (8)$$

The above equation (8) does not include the third vertical speed Zrd of the vehicle body. The first vertical speed Zbd of the vehicle body can be easily and accurately obtained by integrating the vertical acceleration Zbdd of the vehicle body detected by an acceleration sensor, for example. The second vertical speed Zsd of the vehicle body caused by the driver's driving operation can also be easily and accurately determined as described above.

Therefore, in the first mode of the damping force control of the present disclosure, the damping force Fcoat is calculated according to the above equation (8) based on the first vertical speed Zbd of the vehicle body and the second vertical speed Zsd of the vehicle body, The damping coefficient of each shock absorber is controlled so that the damping force of the shock absorber becomes the damping force Fcoat.

In the second mode of the damping force control according to the present disclosure, as expressed by the following equation (9), using the value obtained by subtracting the damping coefficient Cco from the damping coefficient Cat as the damping coefficient Catco, the above equation (8) is equivalently deformed as the following equation (10).

$$Cat - Cco = Catco \quad (9)$$

$$\begin{aligned} Fcoat &= Cco \cdot Zbd + Cat \cdot Zsa - Cco \cdot Zsd \\ &= Cco \cdot Zbd + (Cat - Cco)Zsd \\ &= Cco \cdot Zbd + Catco \cdot Zsd \end{aligned} \quad (10)$$

Similarly to the above equation (8), the above equation (10) does not include the third vertical speed Zrd of the vehicle body, and the variables included in the equation (10) are the first vertical speed Zbd of the vehicle body and the second vertical speed Zsd of the vehicle body that can easily and accurately be obtained.

Therefore, in the second mode of the damping force control of the present disclosure, the damping force Fcoat is calculated according to the above equation (10) based on the first vertical speed Zbd of the vehicle body and the second vertical speed Zsd of the vehicle body, The damping coefficient of each shock absorber is controlled so that the damping force of the shock absorber conforms to the damping force Fcoat. In this case, the damping coefficient Catco may be a value obtained in advance according to the above equation (9).

The present disclosure will now be described in detail with respect to some embodiments by referring to the accompanying drawings.

First Embodiment

The damping force control apparatus 10 according to the first embodiment shown in FIG. 1 is applied to a vehicle 16 having a vehicle body 12 as a sprung mass and wheels 14FL, 14FR, 14RL and 14RR as unsprung masses. Shock absorbers 18FL, 18FR, 18RL and 18RR are mounted between the vehicle body 12 and the wheels 14FL, 14FR, 14RL and 14RR, respectively. The damping force control device 10 includes a damping force controlling electronic control unit 20 that controls damping coefficients CFL, CFR, CRL and CRR of the shock absorbers 18FL, 18FR, 18RL and 18RR.

The shock absorbers 18FL, 18FR, 18RL and 18RR are damping force variable shock absorbers having a plurality of control stages S. The control stages S take n (positive integer) steps ranging from the control stage S1 (soft) having the smallest damping coefficient Ci (i=FL, FR, RL and RR) to the control stage Sn (hard) having the largest damping coefficient Ci. The shock absorbers 18FL to 18RR generate damping forces represented by the products Ci·Vrei of the damping coefficients Ci (i=FL, FR, RL and RR) and relative speeds Vrei (i=FL, FR, RL and RR). The relative speeds Vrei (i=FL, FR, RL and RR) are relative speeds in the vertical direction between the vehicle body 12 and the wheels 14FL, 14FR, 14RL and 14RR, respectively.

The left and right front wheels 14FL and 14FR are steerable wheels, and the left and right rear wheels 14RL and 14RR are non-steerable wheels. The front wheels 14FL and 14FR are steered through a rack bar 26 and tie rods 28L and 28R by an electric power steering device 24 driven in response to an operation of a steering wheel 22 by a driver. Note that the left and right rear wheels 14RL and 14RR may also be supplementarily steered by a rear wheel steering apparatus.

The vehicle 16 has a braking device 30 that applies braking forces to the wheels 14FL to 14RR. The braking device 30 includes a hydraulic circuit 32, wheel cylinders 34FR, 34FL, 34RR and 34RL provided in the wheels 14FL to 14RR, a master cylinder 38 that feeds pressurized brake oil in response to a driver's depression of a brake pedal 36. Although not shown in detail in FIG. 1, the hydraulic circuit 32 includes a reservoir, an oil pump, various valve devices and the like and functions as a brake actuator.

The braking device 30 applies braking forces proportional to pressures in wheel cylinders 34FL to 34RR to the wheels 14FL to 14RR, respectively. The pressures in the wheel cylinders 34FL to 34RR are controlled in accordance with the pressure (master cylinder pressure Pm) in the master cylinder 38 which is normally driven in response to depression of the brake pedal 36 by the driver. That is, a master cylinder pressure Pm is detected by a pressure sensor 40, and the pressures in the wheel cylinders 34FL to 34RR are controlled by a brake controlling electronic control unit 42 based on the master cylinder pressure Pm. Furthermore, the pressures in the wheel cylinders 34FL to 34RR are controlled by the brake controlling electronic control unit 42 as needed, so that the oil pump and various valve devices are controlled by the electronic control unit irrespective of the depression amount of the brake pedal by the driver.

Although not shown in FIG. 1, the vehicle 16 has an engine, not shown, as a driving device that applies a driving forces to driving wheels among the wheels 14FL to 14RR. Depression amount of an accelerator pedal 44 by the driver is detected as an accelerator operation amount Acc by an accelerator opening sensor 46. The output of the engine is usually controlled by an engine control unit 48 based on the accelerator operation amount Acc and is controlled independently of the accelerator operation amount Acc as necessary. Note that the driving device may be any device capable of applying driving forces to the driving wheels, and may be, for example, electric motors, a hybrid system or the like. The driving wheels may be the front wheels 14FL and 14FR or the rear wheels 14RL and 14RR, and further may be the four wheels 14FL to 14RR.

The damping force controlling electronic control unit 20, the brake controlling electronic control unit 42, and the engine control unit 48 exchange necessary signals with each other as necessary. A signal indicating the master cylinder pressure Pm is input to the damping force controlling electronic control unit 20 from the braking controlling electronic control unit 42 as a signal indicating a braking operation amount of the driver. The value indicating the braking operation amount of the driver may be the pressing force applied to the brake pedal 36. Similarly, a signal indicating the accelerator operation amount Acc is input to the damping force controlling electronic control unit 20 from the engine control unit 48 as a signal indicating a driving operation amount of the driver. A signal indicating a vehicle speed V detected by a vehicle speed sensor 50 and a signal indicating a steering angle θ detected by a steering angle sensor 52 are also input to the electronic control unit 20.

The vehicle 16 has vertical acceleration sensors 54FL to 54RR and stroke sensors 56FL to 56RR provided at positions corresponding to the wheels 14FL to 14RR, respectively. The vertical acceleration sensors 54FL to 54RR detect the vertical accelerations $Zdd_i$ (i=FL, FR, RL and RR) of the vehicle body 12 at the positions corresponding to the wheels 14FL to 14RR, respectively that are vertical vibration state quantities of the sprung mass. It should be noted that only three vertical acceleration sensors may be provided and the vertical acceleration of the vehicle body 12 at a position where no vertical acceleration sensor is provided may be estimated based on the three vertical accelerations detected by the three vertical acceleration sensors.

The stroke sensors 56FL to 56RR detect the strokes $S_i$ (i=FL, FR, RL and RR) of the suspensions that suspend the wheels 14FL to 14RR from the vehicle body 12, respectively. The stroke sensors 56FL to 56RR detect the strokes $S_i$ by setting the bound strokes to be positive and rebound strokes to be negative, and setting bound strokes to be zero when the wheels 14FL to 14RR are in the neutral positions where the wheels 14FL to 14RR are neither in the bound nor rebound.

Signals indicating the vertical accelerations $Zdd_i$ of the vehicle body 12 are input from the vertical acceleration sensors 54FL to 54RR to the electronic control unit 20 and signals indicating the strokes $S_i$ ae input from the stroke sensors 56FL to 56RR to the electronic control unit 20. The vertical acceleration sensors 54FL to 54RR function as the first detection devices that detect the vertical accelerations $Zdd_i$ as the vertical vibration state quantities of the vehicle body 12 at the positions of the wheels 14FL to 14RR. The pressure sensor 40, the accelerator opening sensor 46, the vehicle speed sensor 50, and the steering angle sensor 52 function as second detection devices that detect the driver's operation amounts.

Figure 2:
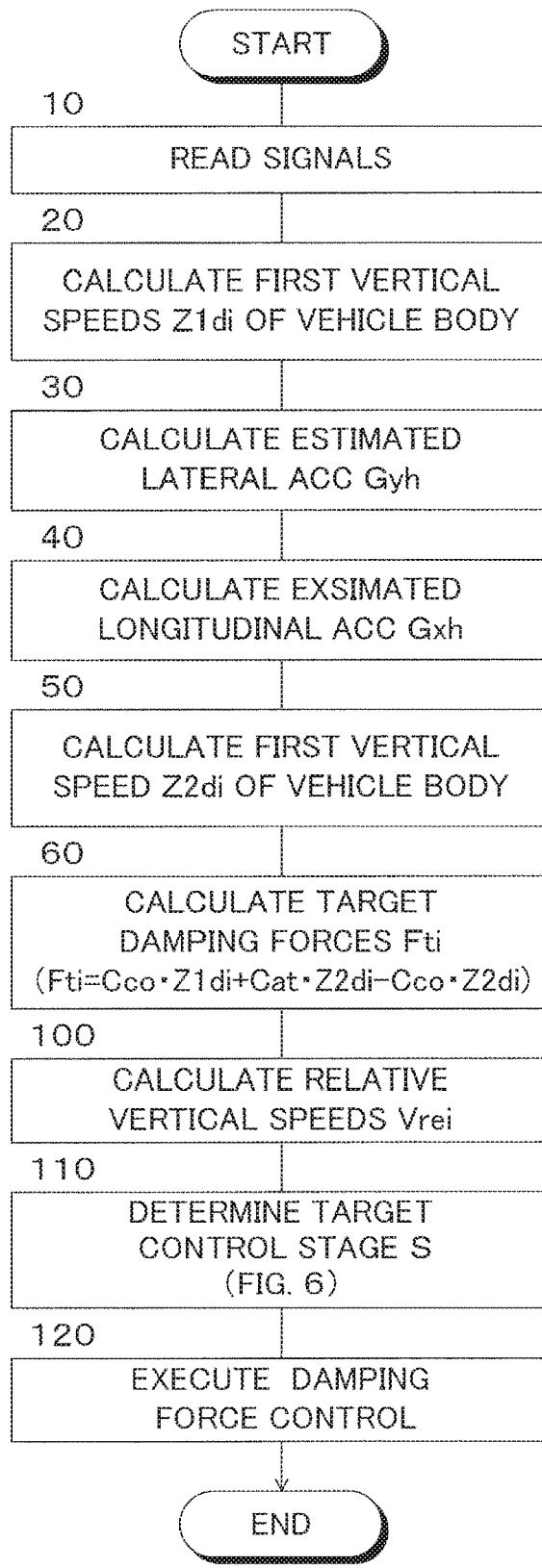
FIG. 2 is a flowchart showing a damping force control routine in the first embodiment.

The damping force controlling electronic control unit 20 functions as a control device that controls damping coefficients $C_i$ of the shock absorbers 18FL to 18RR according to the control program corresponding to the flowchart shown in FIG. 2 based on the information of the signals inputted as described above. Similar to the brake controlling electronic control unit 42 and the engine control unit 50, the damping force controlling electronic control unit 20 may be a microcomputer that has, for example, a CPU, a ROM, a RAM, and an input/output port unit connected to each other by a bidirectional common bus.

The first embodiment is arranged to control the damping coefficients $C_i$ according to the first aspect of the disclosure described above. The damping force control program for controlling the damping coefficients $C_i$ is stored in the ROM of the damping force controlling electronic control unit 20 and the damping coefficients $C_i$ are controlled by the CPU according to the control program. A map shown in FIG. 6, i.e., a map showing the relationship among the vertical relative speeds Vrei between the vehicle body 12 and the wheels 14FL to 14RR, the target damping forces Fti, and the control stages S is stored in the ROM of the damping force controlling electronic control unit 20.

Next, the damping force control routine in the first embodiment will be described with reference to the flowchart shown in FIG. 2. It is to be noted that the control according to the flowchart shown in FIG. 2 is repeatedly executed at predetermined time intervals sequentially for the left front wheel, the right front wheel, the left rear wheel, and the right rear wheel during a time period when an ignition switch (not shown) is ON. In the following description, the control of the damping forces executed according to the flowchart is simply referred to as "control".

First, in step 10, signals indicating the vertical accelerations $Zdd_i$ of the vehicle body 12 detected by the vertical acceleration sensors 54FL to 54RR are read. In step 20, first vertical speeds $Z1d_i$ (i=FL, FR, RL and RR) of the vehicle body 12 at the positions of the wheels 14FL to 14RR are calculated by integrating the vertical accelerations $Zdd_i$.

In step 30, an estimated lateral acceleration Gyh of the vehicle is calculated in a manner known in the art based on the vehicle speed V detected by the vehicle speed sensor 50 and the steering angle θ detected by the steering angle sensor 52.

In step 40, an estimated longitudinal acceleration Gxh of the vehicle is calculated in a manner known in the art based on a master cylinder pressure Pm detected by the pressure sensor 40 and an accelerator opening degree Acc detected by the accelerator opening degree sensor 46.

In step 50, estimated vertical accelerations $Z2dd_i$ (i=FL, FR, RL and RR) of the vehicle body 12 at the positions of the wheels 14FL to 14RR are calculated based on the estimated lateral acceleration Gyh of the vehicle and the estimated longitudinal acceleration Gxh of the vehicle. Further, second vertical speeds $Z2d_i$ (i=FL, FR, RL and RR) of the vehicle body 12 at the positions of the wheels 14FL to 14RR caused by driver's driving operation are calculated by integrating the estimated vertical acceleration $Z2ddi$.

In step 60, target damping forces Fti (i=FL, FR, RL and RR) of the shock absorbers 18FL to 18RR are calculated according to the following equation (11) corresponding to the above equation (8). As in the above equation (8), Cco in the following equation (11) is a damping coefficient (a preset positive constant) for reducing vertical vibrations of the vehicle body 12 caused by inputs from a road surface. Cat is a damping coefficient (a preset positive constant) for suppressing posture change of the vehicle body 12 caused by driver's driving operation.

$$Fti=Cco\cdot Z1di+Cat\cdot Z2di-Cco\cdot Z2di \tag{11}$$

In step 100, strokes Si of the suspensions detected by the stroke sensors 56FL to 56RR are differentiated, so that the vertical relative speeds Vrei (i=FL, FR, RL and RR) between the vehicle body 12 and the wheels 14FL to 14RR at the positions of the wheels are calculated. This step 100 cooperates with the stroke sensors 56FL to 56RR to function as a third detection device for detecting the vertical relative speeds Vrei between the vehicle body 12 and the wheels 14FL to 14RR at the positions of the wheels.

Figure 6:
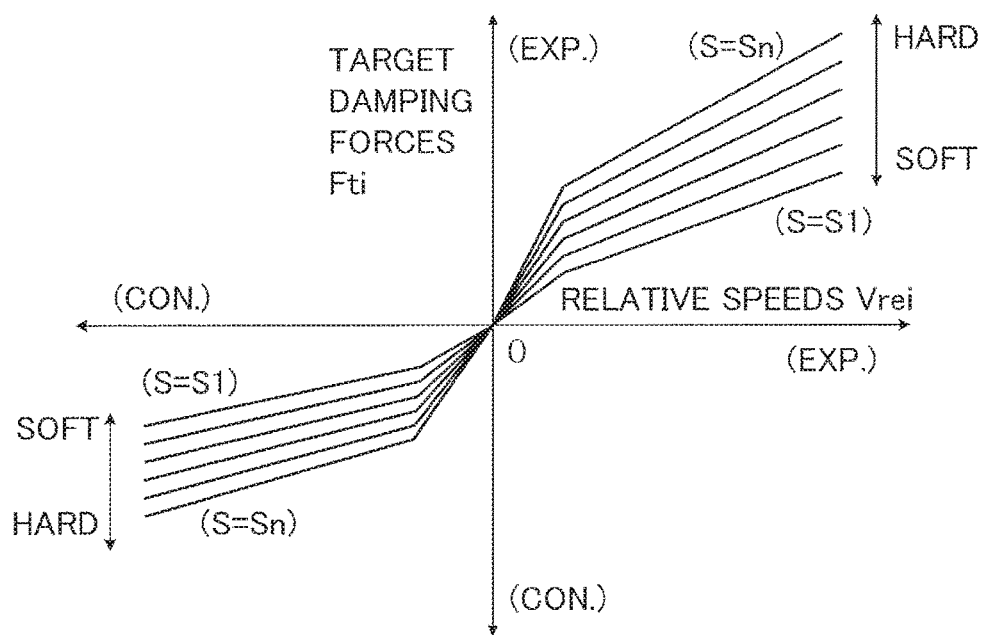
FIG. 6 is a map showing the relationship among relative speeds Vrei in the vertical direction between the vehicle body and wheels, target damping forces Fti, and control steps S of shock absorbers.

In step 110, the map shown in FIG. 6 is referred to based on the target damping forces Fti calculated in step 60 and the vertical relative speeds Vrei calculated in step 100, whereby target control stages S of the shock absorbers 18FL to 18RR are determined. As a result, target damping coefficients Cti corresponding to the target control stages S are calculated.

In step 120, control of the damping forces is executed by controlling the control stages so that the control stages of the shock absorbers 18 FL to 18 RR conform to the target control stages S calculated in step 110. Therefore, the damping coefficients Si of the shock absorbers 18FL to 18RR are controlled to the target damping coefficients Cti, whereby the damping forces of the shock absorbers 18FL to 18RR are controlled to the target damping forces Fti.

As understood from the above explanation, in step 20, the first vertical speeds $Z1di$ of the vehicle body 12 at the positions of the wheels 14FL to 14RR are calculated, and in steps 30 to 50, the second vertical speeds $Z2di$ at the positions of the wheels 14FL to 14RR caused by the driver's driving operation are calculated. Further, in step 60, the target damping forces Fti of the shock absorbers 18FL to 18RR are calculated according to the above equation (11), and in steps 100 to 120, the damping forces of the shock absorbers 18FL to 18RR are controlled so as to conform to the target damping forces Fti.

Since the values $Z1di$-$Z2di$ obtained by subtracting the second vertical speeds $Z2di$ from the first vertical speeds $Z1di$ are equal to the third vertical speeds Zrdi of the vehicle body caused by inputs from a road surface, the above equation (11) is equivalent to the below equation (12) corresponding to the above equation (7). That is, the target damping forces Eli can be calculated as a sum of the damping forces (Cco·Zrdi) for damping the vertical vibrations of the vehicle body 12 caused by inputs from a road surface to improve the ride comfort of the vehicle and the damping forces (Cat·$Z2di$) for suppressing the posture change of the vehicle body 12 generated by the driver's driving operation. Further, the target damping forces Fti include no extra damping force other than the damping forces (Cco·Zrdi) for improving the ride comfort of the vehicle and the damping forces (Cat·$Z2di$) for suppressing the posture change of the vehicle body 12.

$$Fti=Cco\cdot Zrdi+Cat\cdot Z2di \tag{12}$$

Therefore, according to the first embodiment, it is possible to ensure good ride comfort of the vehicle 16 without causing adverse effects such as high-frequency vibrations of the vehicle body 12 due to extra damping forces, and to suppress the change in the posture of the vehicle body 12 caused by the driving operation of the driver.

Second Embodiment

Figure 3:
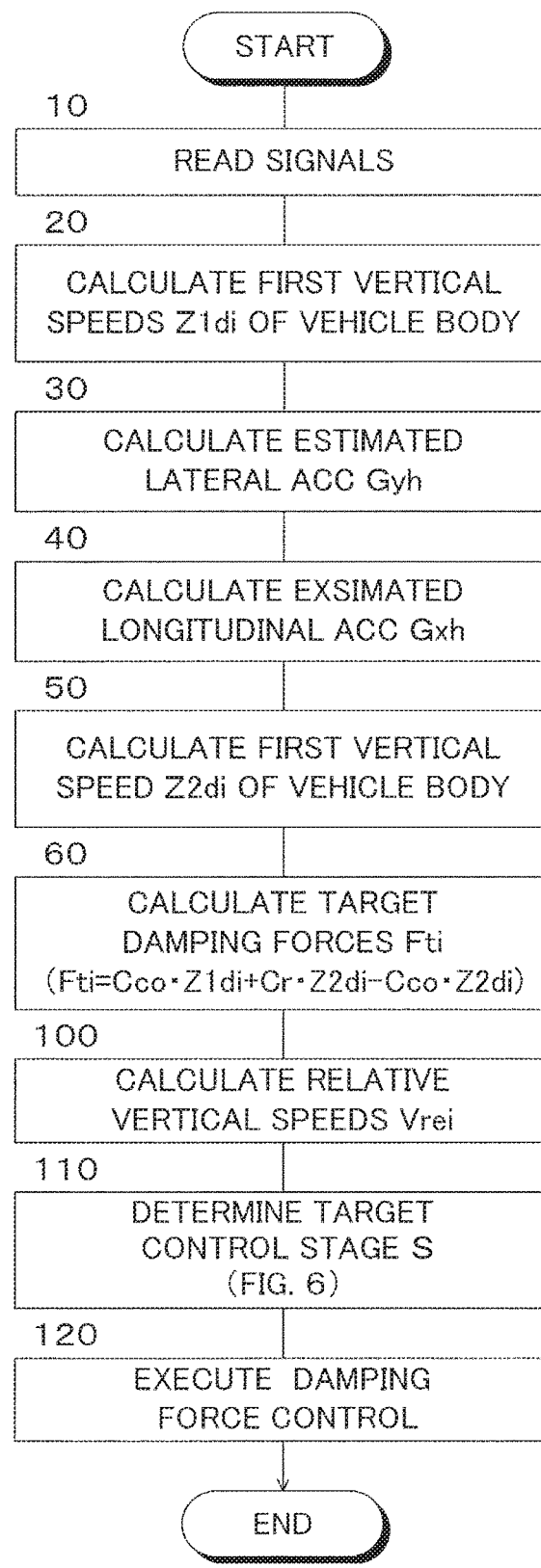
FIG. 3 is a flowchart showing a damping force control routine in the second embodiment of the damping force control device for a vehicle according to the present disclosure.

The second embodiment is configured as a modification example of the first embodiment, and the damping force control in the second embodiment is performed according to the flowchart shown in FIG. 3. In FIG. 3, the same step numbers as those shown in FIG. 2 are assigned to the same steps as those shown in FIG. 2. This also applies to other embodiments to be described later.

Steps 10 to 30 and steps 100 to 120 are executed in the same manners as in the first embodiment. Step 40 in the first embodiment is not executed. When step 30 is completed, in a step 50, estimated vertical accelerations $Z2ddi$ of the vehicle body 12 at the positions of the wheels 14FL to 14RR 12 are calculated in a manner known in the art based on the estimated longitudinal acceleration Gxh of the vehicle. Further, the second vertical speeds $Z2di$ of the vehicle body at the positions of the wheels 14FL to 14RR caused by the driver's steering operation are calculated by integrating the estimated vertical accelerations $Z2ddi$.

When step 50 is completed, step 65 is executed instead of step 60 in the first embodiment. In step 65, target damping forces Fti (i=FL, FR, RL and RR) of the shock absorbers 18FL to 18RR are calculated according to the following equation (13) corresponding to the above equation (8). In the following equation (13), Cr is a damping coefficient (a preset positive constant) for suppressing the rolling of the vehicle body 12 caused by the driver's steering operation.

$$Fti=Cco\cdot Z1di+Cr\cdot Z2di-Cco\cdot Z2di \tag{13}$$

Since, as described above, the values $Z1di$-$Z2di$ obtained by subtracting the second vertical speeds $Z2di$ from the first vertical speeds $Z1di$ are equal to the third vertical speeds Zrdi of the vehicle body caused by inputs from a road surface, the above equation (13) is equivalent to the following equation (14) corresponding to the above equation (7). That is, the target damping force Fti can be calculated as sums of the damping forces (Cco·Zrdi) for damping the vertical vibrations of the vehicle body 12 caused by inputs from a road surface to improve the ride comfort of the vehicle and the damping forces (Cr·$Z2di$) for suppressing rolling of the vehicle body 12 generated by the driver's steering operation. Further, the target damping forces Fti include no extra damping force other than the damping forces (Cco·Zrdi) for improving the ride comfort of the vehicle and the damping forces (Cr·$Z2di$) for suppressing the rolling of the vehicle body 12.

$$Fti=Cco\cdot Zrdi+Cr\cdot Z2di \tag{14}$$

Therefore, according to the second embodiment, it is possible to ensure good ride comfort of the vehicle 16 without causing adverse effects such as high frequency vibrations of the vehicle body 12 due to excessive damping forces, and to suppress rolling of the vehicle body 12 caused by the steering operation of the driver.

Third Embodiment

Figure 4:
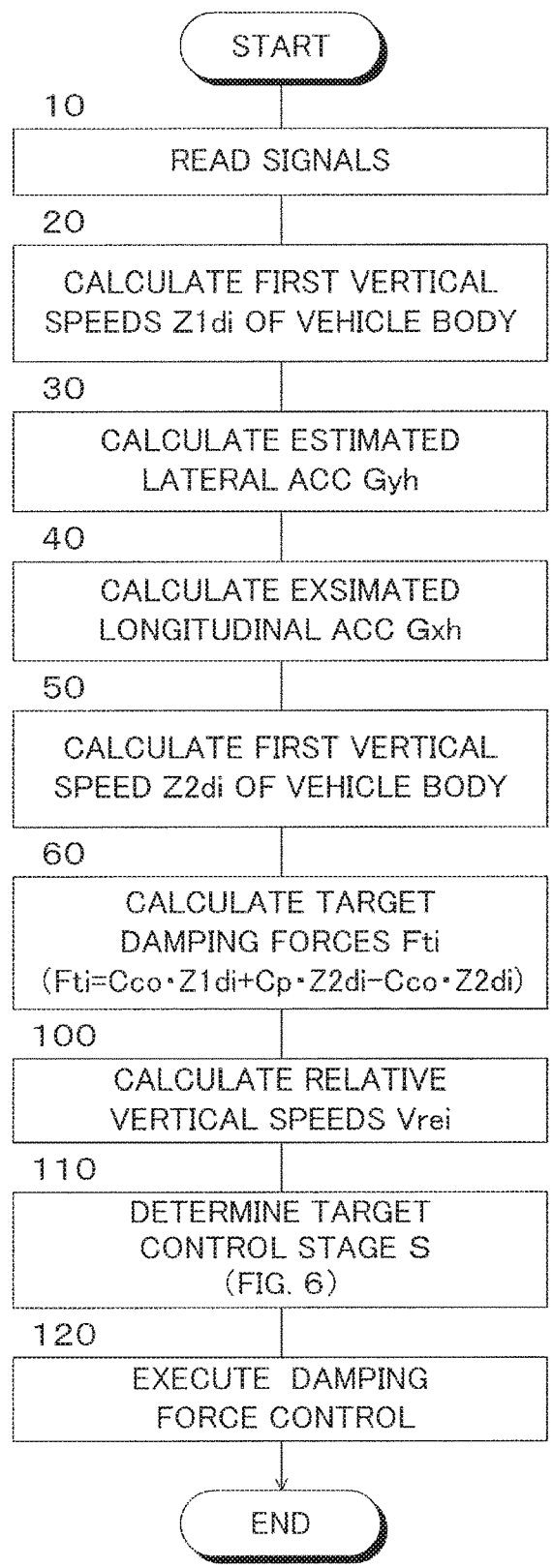
FIG. 4 is a flowchart showing a damping force control routine in the third embodiment of the damping force control device for a vehicle according to the present disclosure.

The third embodiment is also configured as a modification example of the first embodiment, and the damping force control in the third embodiment is performed according to the flowchart shown in FIG. 4.

Steps 10, 20, 40 and 100 to 120 are executed in the same manners as in the first embodiment. Step 30 in the first embodiment is not executed. When step 40 is completed, in a step 50, estimated vertical accelerations Z2ddi of the vehicle body 12 at the positions of the wheels 14FL to 14RR are calculated in the manner known in the art based on the estimated longitudinal acceleration Gxh of the vehicle. Furthermore, second vertical speeds Z2di of the vehicle body 12 at the positions of the wheels 14FL to 14RR caused by driver's acceleration/deceleration operation are calculated by integrating the estimated vertical accelerations Z2ddi.

When step 50 is completed, step 70 is executed instead of step 60 in the first embodiment. In step 70, the target damping forces Fti (i=FL, FR, RL and RR) of the shock absorbers 18FL to 18RR are calculated according to the following equation (15) corresponding to the above equation (8). Cp in the equation (15) and the below-described equation (19) is a damping coefficient for suppressing pitching of the vehicle body 12 caused by driver's acceleration/deceleration operation.

$$Fti=Cco \cdot Z1di+Cp \cdot Z2di-Cco \cdot Z2di \tag{15}$$

As described above, the values Z1di-Z2di obtained by subtracting the second vertical speeds Z2di from the first vertical speeds Z1di are equal to the third vertical speeds Zrdi of the vehicle body caused by inputs from a road surface, so that the above equation (15) is equivalent to the following equation (16) corresponding to the above equation (7). In other words, the target damping forces Fti can be calculated as sums of the damping force (Cco·Zrdi) for damping the vertical vibrations of the vehicle body 12 caused by inputs from a road surface to improve the ride comfort of the vehicle and the damping forces (Cp·Z2di) for suppressing pitching of the vehicle body generated by the driver's acceleration/deceleration operation. Furthermore, the target damping forces Fti include no extra damping force other than the damping forces (Cco·Zrdi) for improving the ride comfort of the vehicle and the damping forces (Cp·Z2di) for suppressing the pitching of the vehicle body 12.

$$Fti=Cco \cdot Zrdi+Cr \cdot Z2di \tag{16}$$

Therefore, according to the third embodiment, it is possible to ensure good ride comfort of the vehicle 16 without causing adverse effects such as high-frequency vibrations of the vehicle body 12 due to excessive damping forces, and to suppress the pitching of the vehicle body 12 caused by the driver's acceleration/deceleration operation.

Fourth Embodiment

Figure 5:
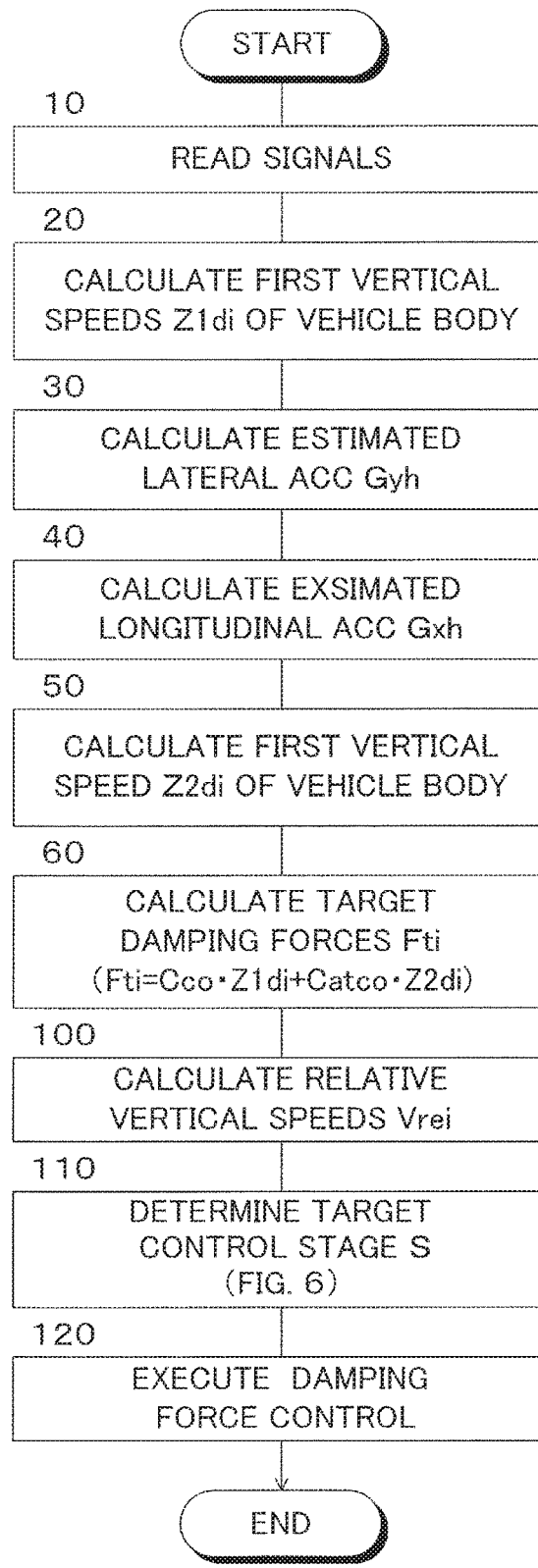
FIG. 5 is a flowchart showing a damping force control routine in the fourth embodiment of the damping force control device for a vehicle according to the present disclosure.

The fourth embodiment is configured to control the damping coefficients Ci according to the second aspect of the disclosure described above. The damping force control in the fourth embodiment is performed according to the flowchart shown in FIG. 5.

In the fourth embodiment, steps 10 to 50 and steps 100 to 120 are executed in the same manners as in the first embodiment. When step 50 is completed, step 80 is executed instead of step 60 in the first embodiment. In step 80, the target damping forces Fti (i=FL, FR, RL and RR) of the shock absorbers 18FL to 18RR are calculated according to the following equation (17) corresponding to the above equation (10). A damping coefficient Catco is obtained in advance as a value derived by subtracting the damping coefficient Cco from the damping coefficient Cat and is stored in the ROM of the damping force controlling electronic control device 20.

$$Fti=Cco \cdot Z1di+Catco \cdot Z2di \tag{17}$$

Since the damping coefficient Catco is a value obtained by subtracting the damping coefficient Cco from the damping coefficient Cat, the above equation (17) is equivalent to the above equation (12) corresponding to the above equation (7). Therefore, by obtaining a value Catco in advance by subtracting the damping coefficient Cco of the ride comfort control from the damping coefficient Cat of the posture control, the target damping forces Fti can be calculated as the sums of the two products that are the right side of the above equation (12). That is, the target damping forces Fti can be calculated as sums of the damping forces (Cco·Zrdi) for damping vertical vibrations of the vehicle body 12 caused by inputs from a road surface to improve the ride comfort of the vehicle and the damping forces (Cat·Z2di) for suppressing the posture change of the vehicle body 12 generated by the driver's driving operation. Further, the target damping forces Fti include no extra damping force other than the damping force (Cco·Zrdi) for improving the ride comfort of the vehicle and the damping forces (Cat·Z2di) for suppressing the posture change of the vehicle body 12.

Therefore, according to the fourth embodiment, as in the first embodiment, it is possible to obtain a good ride comfort of the vehicle 16 without causing adverse effects such as high frequency vibrations of the vehicle body 12 caused by extra damping forces, and to suppress the change in the posture of the vehicle body 12 caused by the driver's driving operation. Furthermore, since the target damping forces Fti are the sums of the two products Cco·Z1di and Catco·Z2di, it is possible to calculate the target damping forces Fti more efficiently than the first to third embodiments in which the target damping forces Fti are calculated as the sums of the three products.

While in the fourth embodiment, the target damping forces Fti are calculated according to the above equation (17), they may be calculated according to the following equation (18) corresponding to the middle equation of the above equation (10).

$$Fti=Cco \cdot Z1di+(Cat-Cco)Z2di \tag{18}$$

Furthermore, as in the first and third embodiments, the damping coefficient Cat in the above equation (18) may be replaced with a damping coefficient Cr for reducing rolling and a damping coefficient Cp for reducing pitching. That is, the target damping forces Fti may be calculated according to the following equation (19) or (20).

$$Fti=Cco \cdot Z1di+(Cr-Cco)Z2di \tag{19}$$

$$Fti=Cco \cdot Z1di+(Cp-Cco)Z2di \tag{20}$$

In a case where an equation for calculating the target damping forces Fti includes the third vertical speeds Zrdi of the vehicle body caused by inputs from a road surface as in the above equations (12), (14) and (16), it is necessary to estimate the third vertical velocity Zrdi. For example, it is necessary to obtain transfer functions of the vertical accelerations from the wheels 14FL to 14RR to the vehicle body 12 beforehand; to detect the vertical accelerations of the wheels; to calculate the third vertical accelerations Zrddi of the vehicle body caused by inputs from a road surface based on the detected vertical accelerations and the transfer functions; and to integrate the third vertical accelerations. Therefore, special detection devices such as vertical acceleration sensors for detecting vertical accelerations of the wheels and calculations based on detected values are necessary.

According to the above-described embodiments, the above equations (11), (13), (15) and (17) for calculating the target damping forces Fti include the first vertical speeds $Z1di$ and the second vertical speeds $Z2di$ of the vehicle body 12 that can easily and accurately be estimated but do not include the third vertical speeds $Zrdi$ of the vehicle body caused by inputs from a road surface. Therefore, special detection devices such as acceleration sensors for detecting vertical accelerations of the wheels are not necessary and it is unnecessary to calculate vertical speeds of the unsprung masses caused by inputs from a road surface based on detected values.

In particular, in the above-described first, second and fourth embodiments, an estimated lateral acceleration Gyh of the vehicle is calculated based on a vehicle speed V and a steering angle θ, and estimated vertical accelerations $Z2ddi$ of the vehicle body 12 are calculated based on at least the estimated lateral acceleration Gyh. Further, the second vertical speeds $Z2di$ of the vehicle body 12 caused by driver's driving operation are calculated by integrating the estimated vertical accelerations $Z2ddi$. Therefore, the vertical speeds at the positions of the wheels due to the rolling of the vehicle caused by driver's steering operation can be estimated as second vertical speeds $Z2di$ based on the steering operation amount of the driver. The estimated lateral acceleration Gyh is advanced in phase compared to an actual lateral acceleration of the vehicle. Therefore, it is possible to reduce a possibility that second vertical speeds $Z2di$ will be delayed behind compared to actual vertical speeds of the vehicle body, as compared to where second vertical speeds $Z2di$ are calculated based on an actual lateral acceleration of the vehicle.

Similarly, in the first, third and fourth embodiments described above, an estimated longitudinal acceleration Gxh of the vehicle is calculated based on a master cylinder pressure Pm and an accelerator opening amount Acc, and estimated vertical accelerations $Z2ddi$ of the vehicle body 12 are calculated based on at least the estimated longitudinal acceleration Gxh. Further, second vertical speeds $Z2di$ of the vehicle body 12 caused by the driver's driving operation are calculated by integrating the estimated vertical accelerations $Z2ddi$. Therefore, the vertical speeds at the positions of the wheels due to the pitching of the vehicle caused by the acceleration/deceleration operation by the driver can be estimated as the second vertical speeds $Z2di$ based on the acceleration/deceleration operation amount of the driver. The estimated longitudinal acceleration Gxh is advanced in phase compared to an actual longitudinal acceleration of the vehicle. Therefore, it is possible to reduce a possibility that second vertical speeds $Z2di$ will be delayed behind compared to actual vertical speeds of the vehicle body, as compared to where the second vertical speeds $Z2di$ are calculated based on an actual longitudinal acceleration of the vehicle.

In particular, according to the above-described first embodiment, a lateral acceleration and a longitudinal acceleration of the vehicle caused by the driver's steering operation and acceleration/deceleration operation are respectively estimated based on the steering operation amount and the acceleration/deceleration operation amount of the driver, and the second vertical speeds $Z2di$ at the positions of the wheels are estimated based on the estimated lateral and longitudinal accelerations Gyh and Gxh. Therefore, even when both a steering operation and an acceleration/deceleration operation are performed by the driver and the vehicle rolls and pitches, the vertical speeds at the positions of the wheels can be estimated as the second vertical speeds $Z2di$.

Further, the lateral and longitudinal accelerations Gyh and Gxh of the vehicle estimated based on the steering operation amount and the acceleration/deceleration operation amount of the driver are advanced in phase as compared to actual lateral and longitudinal accelerations of the vehicle, respectively. Therefore, it is possible to reduce a possibility that estimation of the second vertical speeds $Z2di$ will be delayed as compared to where the second vertical speeds are estimated based on actual lateral and longitudinal accelerations of the vehicle.

Furthermore, according to the above-described second embodiment, a damping coefficient Cr for suppressing rolling of the vehicle body 12 caused by the driver's steering operation is used. Therefore, as compared to where the damping coefficient Cat for suppressing both the posture change of the vehicle body 12 caused by the driver's driving operation, i.e., both rolling and pitching is used as in the first and fourth embodiments, it is possible to more appropriately and more effectively suppress rolling of the vehicle body 12 caused by the driver's steering operation.

Similarly, according to the above third embodiment, a damping coefficient Cp for suppressing pitching of the vehicle body 12 caused by the driver's acceleration/deceleration operation is used. Therefore, as compared to where the damping coefficient Cat for suppressing both the posture change of the vehicle body 12 caused by the driver's driving operation, i.e., both rolling and pitching is used as in the first and fourth embodiments, it is possible to more appropriately and more effectively suppress pitching of the vehicle body 12 caused by the driver's acceleration/deceleration operation.

Although the present disclosure has been described in detail with reference to specific embodiments, the present disclosure is not limited to the above-described embodiments, and various other embodiments are possible within the scope of the present disclosure It will be apparent to those skilled in the art.

For example, in the above-described first, second and fourth embodiments, an estimated lateral acceleration Gyh of the vehicle is calculated based on a vehicle speed V and a steering angle θ, and estimated vertical accelerations $Z2ddi$ of the vehicle body 12 at the positions of the wheels are calculated based on at least the estimated lateral acceleration Gyh. However, an actual lateral acceleration Gy of the vehicle may be detected and estimated vertical accelerations $Z2ddi$ of the vehicle body 12 at the positions of the wheels may be calculated based on at least the lateral acceleration Gy.

Likewise, according to the above-described first, third and fourth embodiments, an estimated longitudinal acceleration Gxh of the vehicle is calculated based on a master cylinder pressure Pm and an accelerator opening amount Acc, and estimated vertical accelerations $Z2ddi$ of the vehicle body 12 at the positions of the wheels are calculated based on at least the estimated longitudinal acceleration Gxh. However, an actual longitudinal acceleration Gx of the vehicle may be detected, and estimated vertical accelerations $Z2ddi$ of the vehicle body 12 at the positions of the wheels may be calculated based on at least the longitudinal acceleration Gx.

In the above-described embodiments, vertical relative speeds Vrei between the vehicle body 12 and the wheels at the positions of the wheels are calculated by differentiating strokes Si of the suspensions. However, the vertical accelerations Zbdi of the vehicle body 12 and the vertical accelerations Zwdi of the unsprung masses are detected and the vertical relative speeds Vrei may be calculated by integrating the differences Zbdi−Zwdi between the vertical accelerations. Further, the vertical acceleration sensors 54FL to 54RR may be omitted, and vertical relative speeds Vrei may be estimated based on the vertical accelerations Zbdi of the vehicle body 12 using a vehicle model.

In the above-described embodiments, target damping forces Fti are calculated based on an estimated lateral acceleration Gyh of the vehicle and/or an estimated longitudinal acceleration Gxh of the vehicle for each cycle of the control according to each flow chart using estimated vertical accelerations Z2ddi. However, when the phases of the estimated vertical accelerations Z2ddi are too earlier than those of the first vertical speeds Z1di of the vehicle body 12 used for calculating the target damping forces Fti, estimated vertical accelerations Z2ddi calculated before the predetermined control cycles may be used.

What is claimed is:

1. A damping force control device for a vehicle that is configured to control damping force variable type shock absorbers mounted between a sprung mass and unsprung masses corresponding to wheels, and comprises
   first detection devices that are configured to detect vertical vibration state quantities of the sprung mass at the positions of the wheels, a second detection device that is configured to detect driver's operation amount, and a control unit that is configured to control damping coefficients of the shock absorbers,
   the control unit is configured to estimate first vertical speeds of the sprung mass at the positions of the wheels based on the vertical vibration state quantities of the sprung mass, to estimate second vertical speeds of the sprung mass caused by driver's driving operation at the positions of the wheels based on driving operation amount of the driver, to calculate target damping forces by subtracting products of damping coefficients of the ride comfort control and the second vertical speeds from the sums of products of the damping coefficients of the ride comfort control and the first vertical speeds and products of damping coefficients for controlling posture change of a vehicle body and the second vertical speeds, and to control damping coefficients of the shock absorbers based on the target damping forces.

2. The damping force control device for a vehicle according to claim 1, wherein the control unit is configured to calculate the target damping forces as sums of products of the damping coefficients of the ride comfort control and the first vertical speeds and products of the second vertical speeds and values that are derived by subtracting the damping coefficients of the ride comfort control from the damping coefficients for controlling posture change of the vehicle body.

3. The damping force control device for a vehicle according to claim 1, wherein the control unit is configured to estimate a lateral acceleration of the vehicle caused by driver's steering operation based on steering operation amount of the driver, and to estimate the second vertical speeds at the positions of the wheels based on the lateral acceleration of the vehicle.

4. The damping force control device for a vehicle according to claim 1, wherein the control unit is configured to estimate a longitudinal acceleration of the vehicle caused by acceleration/deceleration operation of the driver based on acceleration/deceleration operation amount of the driver, and to estimate the second vertical speeds at the positions of the wheels based on the longitudinal acceleration of the vehicle.

5. The damping force control device for a vehicle according to claim 1, wherein the control unit is configured to estimate a lateral acceleration of the vehicle caused by driver's steering operation based on steering operation amount of the driver, to estimate a longitudinal acceleration of the vehicle caused by acceleration/deceleration operation of the driver based on acceleration/deceleration operation amount of the driver, and to estimate the second vertical speeds at the positions of the wheels based on the lateral and longitudinal accelerations of the vehicle.

6. The damping force control device for a vehicle according to claim 1, wherein the damping force control device has a third detection device that is configured to detect vertical relative speeds of the sprung mass and the unsprung masses at the positions of the wheels, and the control unit is configured to calculate target damping coefficients of the shock absorbers based on the target damping forces and the vertical relative speeds and to control damping coefficients of the shock absorbers based on the target damping coefficients.

* * * * *